United States Patent [19]

Fomin et al.

[11] Patent Number: 4,545,042

[45] Date of Patent: Oct. 1, 1985

[54] METHOD FOR GENERATION OF ACOUSTIC VIBRATIONS AND SOURCE OF ACOUSTIC VIBRATIONS FOR REALIZING SAME

[76] Inventors: Viktor I. Fomin, Leninsky prospekt, 26, kv. 18; Stanislav I. Guzenko, Shosseinaya ulitsa, 58, korpus 2, kv. 51; Mikhail N. Egai, ulitsa Udaltsova, 16, kv. 157, all of Moscow; Jury A. Manenkov, ulitsa Ivana Franko, 16, kv. 4, Cheboxary, all of U.S.S.R.

[21] Appl. No.: 432,937

[22] PCT Filed: Feb. 2, 1981

[86] PCT No.: PCT/SU81/00013

§ 371 Date: Sep. 28, 1982

§ 102(e) Date: Sep. 28, 1982

[87] PCT Pub. No.: WO82/02682

PCT Pub. Date: Aug. 19, 1982

[51] Int. Cl.[4] .............................................. G01V 1/38

[52] U.S. Cl. ...................................... 367/189; 310/26; 181/113

[58] Field of Search ............... 367/168, 170, 189, 191, 367/156; 310/26; 318/116, 118, 577; 181/113

[56] References Cited

U.S. PATENT DOCUMENTS

| | | | |
|---|---|---|---|
| 3,160,848 | 12/1964 | Key, Jr. et al. | 367/156 X |
| 3,274,540 | 9/1966 | Melhart | 367/168 |
| 3,734,233 | 5/1973 | Wiley | 367/912 X |
| 3,932,743 | 1/1976 | Sitnichenko | 318/577 X |
| 4,002,900 | 1/1977 | Sitnichenko | 318/577 X |
| 4,157,665 | 6/1979 | Bridoux et al. | 367/7 X |
| 4,184,092 | 1/1980 | Wieser | 318/116 X |
| 4,202,050 | 5/1980 | Klein | 367/105 |

FOREIGN PATENT DOCUMENTS

| | | |
|---|---|---|
| 646882 | 11/1950 | United Kingdom . |
| 251287 | 7/1968 | U.S.S.R. . |
| 575144 | 6/1976 | U.S.S.R. . |

*Primary Examiner*—Nelson Moskowitz
*Assistant Examiner*—Brian S. Steinberger
*Attorney, Agent, or Firm*—Fleit, Jacobson, Cohn & Price

[57] ABSTRACT

A method for generation of acoustic vibrations based on shock excitation of a magnetostriction transducer by a pulse electrical signal. The electrical signal is generated in the form of unidirectional half-cycles of cosinusoidal voltage, with a duration from one to two half-cycles of acoustic vibrations produced by the loaded tansducer. The repetition frequency of the electrical pulses is taken to be equal to, or multiple of the frequency of acoustic vibrations.

A source of acoustic vibrations comprises a power unit (7), a pulse repetition frequency control unit (10) and a reservoir capacitor (6), the plates whereof are connected through a power circuit of a switching element (5) to a field winding (2) of the magnetostriction transducer (1). The source also comprises an auxiliary field winding (3) disposed on the same magnetostriction transducer (1) and connected by the aiding connection method to the winding (2); an auxiliary switching element (8); and a switching element control unit (9). The auxiliary winding (3) is connected to the plates of the capacitor (6) through a power circuit of the switching element (8) and through the power unit (7), and an output of the pulse repetition frequency control unit (10) is connected to an input of the switching element control unit (9), the outputs whereof are connected to control circuits of the switching elements (5 and 8), respectively.

The source of acoustic vibrations is designed primarily for ultrasonic descaling of heat-exchange apparatus.

2 Claims, 7 Drawing Figures

METHOD FOR GENERATION OF ACOUSTIC VIBRATIONS AND SOURCE OF ACOUSTIC VIBRATIONS FOR REALIZING SAME

TECHNICAL FIELD

The present invention relates to ultrasonic engineering, and, more particularly, to a method for generation of acoustic vibrations and to a source of acoustic vibrations.

BACKGROUND ART

Known in the art is a method for generation of acoustic vibration pulses based on shock excitation of a magnetostriction transducer described in British Pat. No. 646,882, published in 1950. This method for generation of acoustic vibrations includes a charged capacitor which is discharged through a winding of the transducer.

There is also known a method for generation of acoustic vibrations, whereby a magnetostriction transducer is excited by pulses of current supplied to the winding thereof at a repetition rate 3 to 10 times lower than, and multiple of the natural frequency of the magnetostriction transducer, with the pulse duration not exceeding $\frac{1}{2}$ of the acoustic vibration period (cf. USSR Inventor's Certificate No. 251,287, dated July 1, 1968). The spectral composition of exciting signals used in embodiments of both methods mentioned above does not provide for full utilization of the magnetostrictive properties of the material incorporated in the transducer, hence, the amplitude and power of acoustic vibrations generated by the prior-art methods are insufficient for carrying out the major part of production processes.

A pulse source of acoustic vibrations is known (cf. British Pat. No. 646,882, published 1950) which serves for preventing scale formation in thermal generating units. The source incorporates a magnetostriction transducer, a mechanical switching element, a reservoir capacitor, a power unit, and a pulse repetition frequency control unit.

The prior-art source employs the above-mentioned method for generation of acoustic vibrations, whereby the previously charged reservoir capacitor is discharged through the magnetostriction transducer winding, and inherits all the disadvantages of the method described above. Moreover, the source is characterised by low response, and the power thereof is limited because of the use of the mechanical switching element in the source circuit.

Another source of acoustic vibrations known in the art comprises a power source, a pulse repetition frequency control unit connected thereto by the input thereof, and a reservoir capacitor. A field winding of a magnetostriction transducer is connected to plates of the capacitor through a power circuit of a switching element (using a thyristor) (cf. USSR Inventor's Certificate No. 575,144, dated Oct. 5, 1977). The prior-art source inherits a low efficiency resulting from poor excitation of the magnetostriction transducer. The vibration amplitude of the magnetostriction transducer of the above source is limited to a static magnetostriction value and is not higher than 1 to 1.4 μm on a vibration frequency of 20 kHz. Therefore, the amplitude of ultrasonic vibrations cannot be raised by increasing the amplitude of the electrical signal pulse serving to excite the transducer above a definite level depending on saturation of the given material.

DISCLOSURE OF THE INVENTION

It is an object of this invention to provide a method of generation of acoustic vibrations which will permit maximum utilization of the magnetostriction properties of material whereof the transducer core is made, and, hence, an increase in the amplitude and power of acoustic vibrations, and also to provide a source of acoustic vibrations for realizing same, characterized by simple design and a high efficiency.

This object is accomplished by a method for generation of acoustic vibrations based on shock excitation of a magnetostriction transducer by an electrical pulse signal, wherein the excitation pulse signal is generated in the form of unidirectional half-cycles of a cosinusoidal voltage with a duration (d) from one to two acoustic vibration half-cycles of the loaded transducer (assuming P is the period duration of the acoustic vibration of the loaded transducer, and $P_{\frac{1}{2}}$ is the half-cycle period thereof, $P_{\frac{1}{2}} < d \leqq P$ or $(\frac{1}{2})P < d \leqq P$), with a repetition frequency of the cosinusoidal half-cycle voltage ($f_v$) equal to, or multiple of the acoustic vibration frequency ($f_1$), such that $nf_v = f_1$.

With this object in view, a source of acoustic vibrations is herein proposed, comprising a power unit, a pulse repetition frequency control unit and a reservoir capacitor, the plates whereof are connected through a power circuit of a switching element to a field winding of a magnetostriction transducer, which source is provided, according to the invention, with an auxiliary field winding disposed on the magnetostriction transducer and connected by the aiding connection method to the main field winding, with an auxiliary switching element and with a switching element control unit, wherewith the auxiliary field winding is connected to the reservoir capacitor plates in series through a power circuit of the auxiliary switching element and through the power unit, and an output of the pulse repetition frequency control unit is connected to an input of the switching element control unit, the outputs whereof are connected to respective control circuits of the main and auxiliary switching elements.

The method for generation of acoustic vibrations realized in accordance with the present invention provides for maximum utilization of the magnetostriction properties of the transducer core material, and thus for a high efficiency of generation of acoustic vibrations.

The source of acoustic vibrations according to the invention is simple with respect to the circuit design, employs elements widely used in modern electrical engineering, and provides for a high power output along with a high efficiency, high dependability and high operating stability.

BRIEF DESCRIPTION OF THE DRAWINGS

The present invention may be further understood by reference to the following description of a specific embodiment thereof taken in conjunction with the accompanying drawings, wherein.

BEST MODE FOR CARRYING OUT THE INVENTION

The exact nature of the method for generation of acoustic vibrations consists in the following.

The winding of the magnetostriction transducer is fed with an excitation pulse electrical signal in the form of a unidirectional half-cycle of a cosinusoidal voltage. A pulse of current produced in the winding sets up a magnetic field which magnetizes the core material, with the result that a magnetostrictive force is produced which tends to alter the length of the core. Variation of the core length with time depends on the natural frequency of transducer mechanical oscillations and on the acoustic load impedance, and is vibratory in nature.

Figure 1:
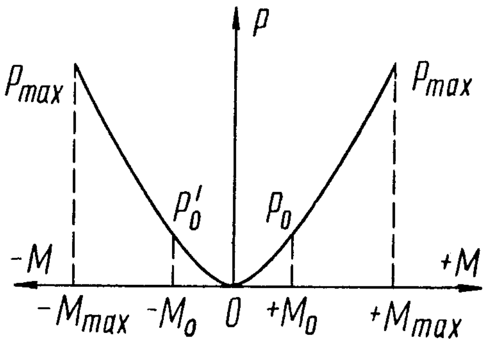
FIG. 1 shows the relationship between a magnetostrictive force P and magnetization M of a transducer core.

For increasing the amplitude of the transducer mechanical vibrations, it is expedient that the magnetostrictive force P is raised to a level close to saturated conditions $P_{max}$ (FIG. 1).

Since the dependence of the magnetostrictive force P on the magnetization M is expressed by $P=f(M^{\alpha})$, where M is the transducer core magnetization, and $\alpha$ is in the range of 1 to 2, up to the saturated condition, for the majority of magnetostriction materials, the duration of cosinusoidal voltage half-cycles is taken to be equal to $\alpha$ half-cycles of acoustic vibrations produced by the loaded transducer.

In the case of linear dependence of the magnetostrictive force on the magnetization, the cosinusoidal voltage half-cycle duration is taken to be equal to one half-cycle of acoustic vibrations generated by the loaded transducer.

In the case of quadratic dependence $P=f(M^2)$, the duration of the cosinusoidal voltage half-cycle is taken to be equal to two half-cycles of the acoustic signal generated by the loaded transducer.

If the duration of the excitation cosinusoidal voltage pulses is adjusted as described hereinabove, the natural frequency of the magnetostriction transducer is coincident with the maximum level of the magnetostrictive force spectrum.

On completion of the electrical pulse, the external magnetic field and, hence, the magnetostrictive force P proper disappear, and the vibratory system of the transducer continues changing the dimensions thereof by virtue of the energy stored therein. The core material demagnetizes to a level of residual magnetization equivalent to a residual magnetostrictive force $P_o$ (FIG. 1). When subsequent unidirectional pulses of the excitation cosinusoidal voltage are applied, the magnetostrictive force varies in the range from $P_o$ to $P_{max}$.. The magnetostriction curve section from $P_o$ is $P_o'$, characterized by low magnetostriction is not utilized.

Figures 3A, 3B, 3C, 3D, 3E:
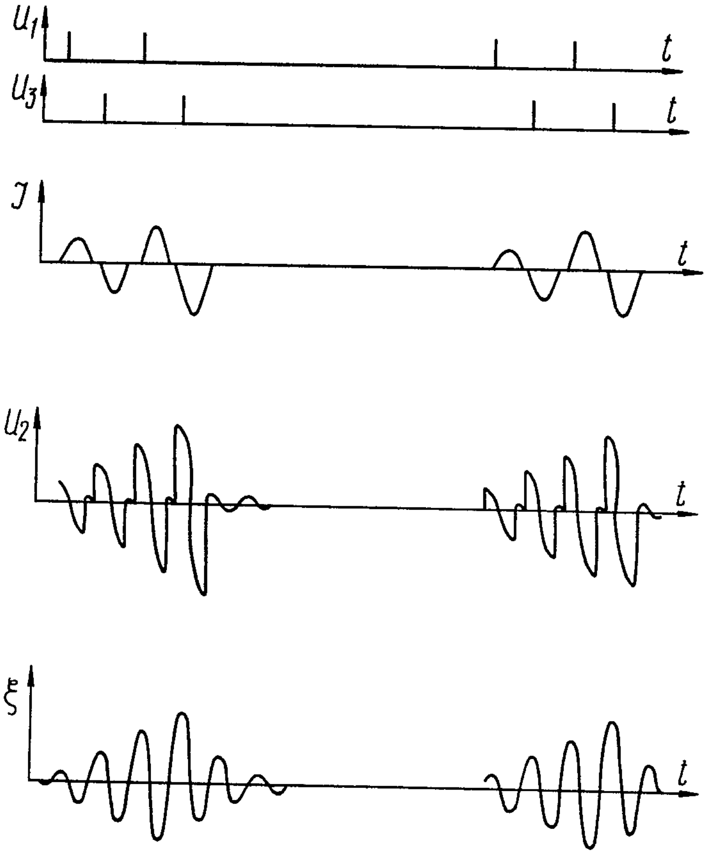
FIG. 3 (*a, b, c, d* and *e*) presents waveforms of electrical and mechanical signals at various points of a circuit of the source of acoustic vibrations (with time plotted on the X-axis).

The frequency of the excitation electrical pulses ($f_v$) is taken to be equal to, or multiple (n) of the frequency of acoustic vibrations ($f_1$) produced by the loaded transducer, ($nf_v=f_1$) with the result that the magnetostrictive force acts in step with the transducer vibrations. Such operation is possible because each subsequent pulse of the cosinusoidal voltage is applied to the transducer winding at the instant when the transducer vibrating together with the load is in state which corresponds to a transfer from the negative region to the positive one (FIG. 3 *e*). The vibration amplitude of the core (that is, the amplitude of the acoustic vibrations) gradually increases. The amplitude increases from one pulse to another till the energy each time added to the transducer becomes equal to the energy of radiation and losses occuring in the transducer during the same time period.

After the cosinusoidal voltage pulses supplied to the winding of the magnetostriction transducer are cut off, the vibrations thereof gradually converge.

The source of acoustic vibrations for realizing the method for generation of acoustic vibrations, according to the invention, comprises a magnetostriction transducer 1 (FIG. 2), a main winding 2 and an auxiliary winding 3 disposed on the core 4 thereof and connected by the aiding connection method. The main winding 2 is connected through a power circuit of a main switching element 5 to plates of a reservoir capacitor 6. The source also incorporates a power unit 7 connected through a power circuit of an auxiliary switching element 8 and through the auxiliary winding 3 to the plates of the capacitor 6. Connected to control circuits of the switching elements 5 and 8 by the outputs thereof is a control unit 9 which controls the switching elements, and which is connected by one input thereof to an output of a pulse repetition frequency unit 10, the other input whereof is connected through a phase-inverting circuit 11 to a feedback transmitter 12. The latter can be in the form of a piezoelectric or electromagnetic transducer mechanically coupled with the core 4. The switching elements 5 and 8 may be in the form of gate thyristors. The pulse repetition frequency control unit 10 may be hooked around a self-excited oscillator or an external-triggering one-shot multivibrator.

The switching element control unit 9 may be hooked around a symmetric one-shot multivibrator synchronized by a signal supplied from the feedbaack transmitter 12.

During vibration of the magnetostriction transducer 1, the feedback transmitter 12 puts out an electrical signal corresponding to the mechanical vibrations of the transducer 1.

If the frequency of control pulses set up by the switching element control unit 9 coincides with the natural frequency of the loaded transducer 1, the synchronizing signal fed from the output of the phase-inverting circuit 11 does not affect the repetition frequency of the control pulses. If the repetition frequency of the control pulses departs from the natural vibration frequency of the loaded transducer 1, the signal derived from the output of the phase-inverting circuit 11 appropriately changes the control pulse repetition frequency and thus permits the magnetostriction transducer 1 to operate on its resonant frequency and to radiate a maximum of acoustic energy.

The source of acoustic vibrations operates as follows. The pulse repetition frequency control unit 10 produces a pulse for triggering the switching element control unit 9. The unit 9 generates a control pulse $U_1$ (FIG. 3 *a*) which triggers the auxiliary switching element 8 (FIG. 2) serving to connect the reservoir capacitor 6 to the output of the power unit 7 through the auxiliary winding 3. The reservoir capacitor 6 charges with a current I (FIG. 3 *c*) flowing from the power unit 7 (FIG. 2) through the auxiliary switching element 8 and winding 3 of the transducer 1. The charge is oscillatory in nature, and the variation of a voltage $U_2$ (FIG. 3 *d*) across the windings 2 and 3 of the transducer 1 is nearly a cosinusoidal half-cycle. The resulting force P produced in the megnetostriction material of the core 4 sets the vibratory system of the transducer 1 in motion. The most intense vibrations occur on the frequencies close to the natural frequencies which depend on the equivalent mass, elasticity of the transducer 1, and the load impedance. For increasing the amplitude of acoustic vibrations, the duration of the electrical excitation pulse (FIGS. 3 *c, d*) depending on the capacitance of the reservoir capacitor 6 an on the inductance of one winding 2 or 3 (FIG. 2), considering nonlinear character of the magnetostriction characteristic and the effects of the transducer mechanical section on the electrical section in transient process, is selected in the range from one to two half-cycles of the loaded transducer resonant frequency. At the instant when a current I (FIG. 3 *c*) drops to zero, the switching element 8 (FIG. 2) is shorted out, and the transducer 1 starts vibrating freely. During this time interval, the voltage $U_2$ (FIG. 3 *d*) is induced across the windings 2 and 3 due to an inverse magnetostriction effect. When the variation of vibrations produced by the transducer 1 passes zero level in the direction from the negative region to the positive one (FIG. 3 *e*), the control unit 9 (FIG. 2) produces a triggering pulse $U_3$ (FIG. 3 *b*) for starting the switching element 5 (FIG. 2) which discharges the reservoir capacitor 6 through the main winding 2 of the transducer 1. Both the charge and discharge of the capacitor 6 are oscillatory in nature, and continue during a time close to a charging time of the capacitor 6 (FIG. 3 *c*). Since both windings 2 (FIG. 2) and 3 are inserted by aiding connection, the current I discharged by the capacitor 6 induces a magnetic field in the core 4 directed identically to that induced during the charge of the capacitor 6. Thus, the transducer 1 is energized in step with the vibrations thereof, with the result that the vibrations are increased, and a unidirectional cosinusoidal half-cycle voltage pulse is induced in the windings 2 and 3 of the transducer 1.

Figure 2:
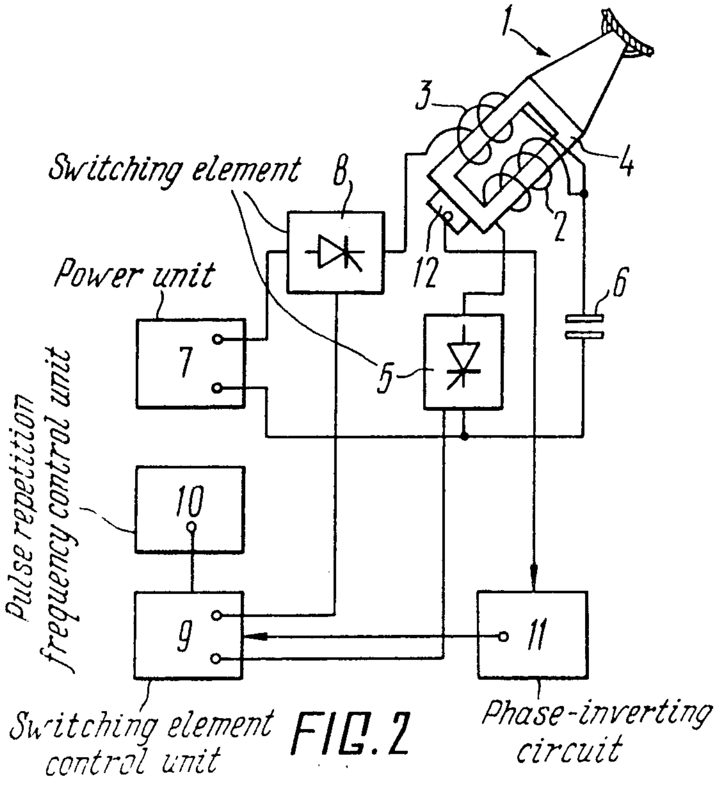
FIG. 2 is a block digram of a source of acoustic vibrations.

At the end of the pulse of the current I (FIG. 3 *c*), the switching element 5 is disconnected, and the capacitor 6 acquires a charge of opposite polarity in relation to the power source 7. During a repeated triggering of the switching element 8, the pulse of the current I (FIG. 3 *c*), and the voltage $U_2$ in the transducer windings 2 and 3 (FIG. 3 *d*) increase as compared to the previous charging cycle of the capacitor 6, along with a further increase in the amplitude of vibrations (FIG. 3 *e*) of the transducer 1 (FIG. 2).

The vibration amplitude rises during alteration of charges and discharges of the capacitor 6 through the windings 2 and 3 of the transducer 1 until the energy added and the energy spent within the same time become equal. After the pulse repetition frequency control unit 10 stops operating, and the switching element control unit 9 stop producing the pulses $U_1$ and $U_2$ (FIGS. 3 *a, b*), and at the instant of time when the current I (FIG. 3 *c*) through the windings 2 (FIG. 2) and 3 and through the switching elements 5 or 8 drops to zero, both switching elements 5 and 8 remain in nonconductive state, and the vibrations of the transducer 1 gradually converge (FIG. 3 *e*). During generation of the next pulse of all acoustic vibrations, the above processes are repeated.

It is possible that the source operates under conditions when the switching elements operating during generation of acoustic pulses or continuous vibrations are actuated with a frequency which is lower than that of acoustic vibrations, but is multiple of it. Therefore, excitation pulses are delivered to the transducer at a frequency $f_v$ whereby $nf_v = f_l$ wherein n is an integer multiple and $f_l$ is the acoustic frequency of the loaded transducer. The source of acoustic vibrations of the present invention permits increasing the efficiency of exitation of the magnetostriction transducers by 3 times as compared to shock-excitation pulse sources.

As regards the power output, the source of acoustic vibrations according to the invention is analogous to the prior-art sources of acoustic vibrations wherein the magnetostriction transducers are excited under linear conditions.

INDUSTRIAL APPLICABILITY

The source of acoustic vibrations according to the present invention designed for realizing the novel method for generation of acoustic vibrations can most advantageously be used in various ultrasonic production processes, including ultrasonic cutting, ultrasonic descaling of heat-exchange apparatus, ultrasonic welding, medical practice, etc.

We claim:

1. A method of generating acoustic vibrations based on the shock excitation of a loaded magnetostriction transducer by a pulse electrical signal comprising the steps of:
   - determining the period P of acoustic vibrations by the loaded transducer and frequency $f_l$ thereof generated by the loaded transducer;
   - producing unidirectional half-cycles of cosinusoidal voltage excitation pulses having a duration d from one to two half-cycles of said period P of acoustic vibrations ($\frac{1}{2}P < d \leqq P$) and having a repetition frequency $f_v$ which is a multiple n of the acoustic vibration frequency($nf_v = f_l$); and
   - applying said excitation pulses to said transducer and converting said excitation pulses into a magnetization pulse in said transducer such that said magnetization pulse has a duration and frequency substantially equal to the duration and frequency of said excitation pulses.

2. A source of acoustic vibrations comprising:
   - a power unit;
   - a magnetostriction transducer having a main field winding and an auxiliary field winding disposed thereon, said auxiliary field winding connected by the aiding connection method to said main field winding such that current flowing in respective predetermined directions through said main field winding and said auxiliary field winding induces a unidirectional magnetic field in said transducer;
   - a first and a second switch means;
   - a reservoir capacitor coupled in parallel with the combination of said main field winding and said first switch means and coupled in parallel with the combination of said auxiliary field winding, said second switch means and said power unit;
   - a pulse repetition frequency control means; and
   - a control means, actuated by said pulse repetition frequency control means, for generating control signals and applying said control signals to said first switch means and to said second switch means to actuate the same and to establish a plurality of substantially consinusoidal half-cycle excitation voltage pulses respectively across said auxiliary field winding upon closure of said second switch means and across said main field winding upon closure of said first switch means wherein each said excitation voltage pulse has a duration from one to two half-cycles of the natural vibratory frequency of the loaded transducer and a repetition frequency which is a integer multiple of said natural frequency.

* * * * *